US012600345B2

(12) United States Patent
Ito

(10) Patent No.: US 12,600,345 B2
(45) Date of Patent: Apr. 14, 2026

(54) EXHAUST GAS PURIFICATION UTILIZING A CLUTCH TO SWITCH BETWEEN DRIVING FORCES IN A HYBRID VEHICLE

(71) Applicant: ISUZU MOTORS LIMITED, Yokohama (JP)

(72) Inventor: Hikaru Ito, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 150 days.

(21) Appl. No.: 18/439,832

(22) Filed: Feb. 13, 2024

(65) Prior Publication Data

US 2024/0278769 A1      Aug. 22, 2024

(30) Foreign Application Priority Data

Feb. 21, 2023      (JP) ................................. 2023-024797

(51) Int. Cl.
*B60W 20/16*          (2016.01)
*B60W 10/02*          (2006.01)
(Continued)

(52) U.S. Cl.
CPC ............ *B60W 20/16* (2016.01); *B60W 10/02* (2013.01); *B60W 10/06* (2013.01); *B60W 10/08* (2013.01);
(Continued)

(58) Field of Classification Search
CPC ...... B60W 20/16; B60W 10/02; B60W 10/06; B60W 10/08; B60W 2510/0208; B60W 2510/0638; B60W 2510/0671; B60W 20/20; B60W 20/15; B60W 20/40; Y02T 10/62; B60K 6/24; B60K 6/26; B60K 6/28; B60K 13/04; F02D 29/02; F02D 29/06; F02D 41/027; F02D 2200/101; F02D 2200/503

See application file for complete search history.

(56) References Cited

U.S. PATENT DOCUMENTS 4,774,811 A      10/1988  Kawamura
6,422,001 B1      7/2002  Sherman et al.
(Continued)

FOREIGN PATENT DOCUMENTS

CN          102019847 A      4/2011
DE      102005018575 A1      1/2006
(Continued)

*Primary Examiner* — Brian P Sweeney
(74) *Attorney, Agent, or Firm* — Shih IP Law Group, PLLC

(57)          ABSTRACT

A vehicle includes: an electric motor that generates a first driving force for rotationally driving drive wheels of the vehicle, an engine that generates a second driving force for rotationally driving the drive wheels of the vehicle, an exhaust gas purification device that purifies exhaust gas generated in the engine, a generator that generates electric power using the second driving force, and a clutch that switches whether or not to transmit the second driving force to the drive wheels, wherein when the second driving force is not being transmitted to the drive wheels, the engine operates at a higher rotational speed than when the second driving force is being transmitted to the drive wheels, and the electric motor generates the first driving force using the electric power generated by the generator by using the second driving force.

3 Claims, 5 Drawing Sheets

(51) Int. Cl.
    *B60W 10/06*        (2006.01)
    *B60W 10/08*        (2006.01)

(52) U.S. Cl.
    CPC .............. *B60W 2510/0208* (2013.01); *B60W 2510/0638* (2013.01); *B60W 2510/0671* (2013.01)

(56)         References Cited

U.S. PATENT DOCUMENTS

| | | |
|---|---|---|
| 9,732,681 B2 | 8/2017 | Haughton et al. |
| 2001/0054416 A1 | 12/2001 | Yoshizaki |
| 2009/0031724 A1 | 2/2009 | Ruiz |
| 2011/0018267 A1 | 1/2011 | Oriet et al. |
| 2012/0017585 A1 | 1/2012 | Shimizu |
| 2012/0273288 A1 | 11/2012 | Yamazaki |
| 2012/0329603 A1 | 12/2012 | Yamazaki et al. |
| 2014/0172207 A1 | 6/2014 | Akashi et al. |
| 2020/0158039 A1 | 5/2020 | Aoki et al. |
| 2020/0398818 A1 | 12/2020 | Nagamine |
| 2020/0398819 A1 | 12/2020 | Higuchi |

FOREIGN PATENT DOCUMENTS

| | | | | | |
|---|---|---|---|---|---|
| DE | 102005008156 A1 | | 9/2006 | | |
| DE | 60119469 T2 | | 11/2006 | | |
| DE | 602005000146 T2 | | 10/2007 | | |
| JP | 2000-045817 A | | 2/2000 | | |
| JP | 2001-329902 A | | 11/2001 | | |
| JP | 2002-038962 A | | 2/2002 | | |
| JP | 2009-126303 A | | 6/2009 | | |
| JP | 2010-180708 A | | 8/2010 | | |
| JP | 2013-181393 A | | 9/2013 | | |
| JP | 2014-051199 A | | 3/2014 | | |
| JP | 2014-117962 A | | 6/2014 | | |
| JP | 2015-229930 A | | 12/2015 | | |
| JP | 2016-175498 A | | 10/2016 | | |
| JP | 2017105354 A | * | 6/2017 | ........... | B60W 10/06 |
| JP | 2017-145748 A | | 8/2017 | | |
| JP | 2017178006 A | * | 10/2017 | ........... | B60W 10/06 |
| JP | 2017214893 A | | 12/2017 | | |
| JP | 2020-128134 A | | 8/2020 | | |
| JP | 2022-164093 A | | 10/2022 | | |
| WO | 2010098360 A1 | | 9/2010 | | |
| WO | 2012081272 A1 | | 6/2012 | | |
| WO | 2019073561 A1 | | 4/2019 | | |
| WO | 2019-116589 A1 | | 6/2019 | | |

* cited by examiner

EXHAUST GAS PURIFICATION UTILIZING A CLUTCH TO SWITCH BETWEEN DRIVING FORCES IN A HYBRID VEHICLE

CROSS-REFERENCE TO RELATED APPLICATIONS

The present application claims priority to Japanese Patent Applications number 2023-024797, filed on Feb. 21, 2023. The contents of this application are incorporated herein by reference in their entirety.

BACKGROUND OF THE INVENTION

There are known technologies by which an exhaust gas purification device, for collecting soot in exhaust gas discharged from an engine, is regenerated when it is detected during traveling of a vehicle that soot has accumulated in the exhaust gas purification device. For example, Japanese Unexamined Patent Application Publication No. 2017-178006 discloses that an engine and a motor generator become disengaged when a clutch connecting the engine and the motor generator is disconnected. Japanese Unexamined Application Publication No. 2017-178006 discloses that when the engine and the motor generator are disconnected for such a specific reason, and a vehicle is in a solely-running-on-motor state, during which the vehicle travels on a driving force generated by the motor generator, the retarder is activated, and engine combustion is engaged. This enables regeneration of the exhaust gas purification device by increasing a temperature of the exhaust gas flowing into the exhaust gas purification device through engagement of the engine combustion and activation of the retarder to apply a load to the engine.

BRIEF SUMMARY OF THE INVENTION

However, a driving force generated by the engine is not used to cause traveling of the vehicle during the regeneration of the exhaust gas purification device in the method described in Japanese Unexamined Application Publication No. 2017-178006, and therefore there is a reduction of fuel efficiency of the vehicle.

The present disclosure focuses on this point, and its object is to provide a vehicle capable of suppressing a reduction of fuel efficiency of the vehicle when an exhaust gas purification device is regenerated during traveling of the vehicle.

A vehicle according to an aspect of the present disclosure includes: an electric motor that generates a first driving force for rotationally driving drive wheels of the vehicle; an engine that generates a second driving force for rotationally driving the drive wheels of the vehicle; an exhaust gas purification device that purifies exhaust gas generated in the engine; a generator that generates electric power using the second driving force; and a clutch that switches whether or not to transmit the second driving force to the drive wheels, wherein when the second driving force is not being transmitted to the drive wheels, the engine operates at a higher rotational speed than when the second driving force is being transmitted to the drive wheels, and the electric motor generates the first driving force using the electric power generated by the generator by using the second driving force.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Outline of a Vehicle]

Figure 1:
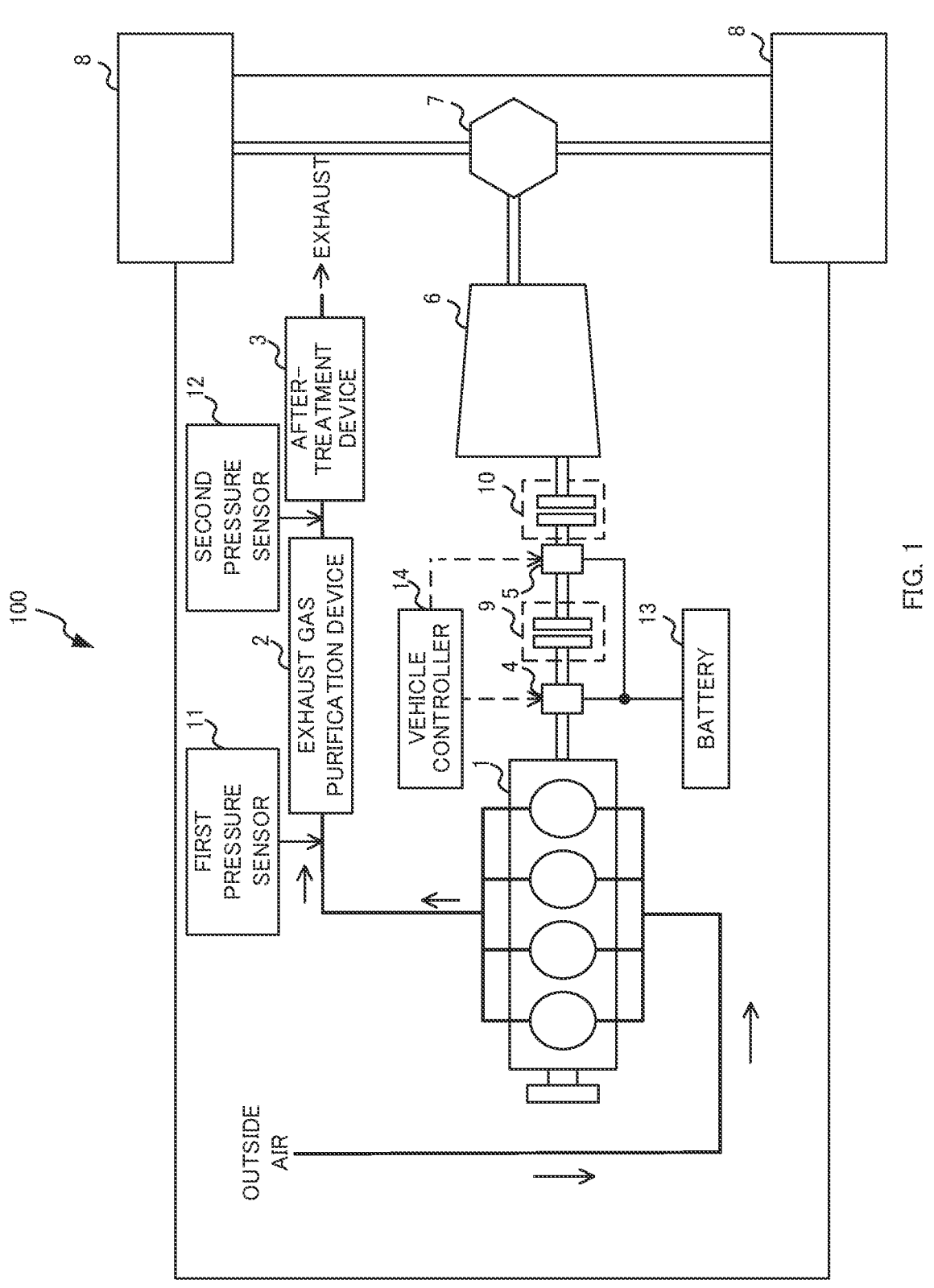
FIG. 1 shows a configuration of a vehicle according to an embodiment.

FIG. 1 shows a configuration of a vehicle 100 according to the present embodiment. The vehicle 100 includes an engine 1, an exhaust gas purification device 2, an after-treatment device 3, a generator 4, an electric motor 5, a transmission 6, a differential gear 7, a plurality of drive wheels 8, a first clutch 9, a second clutch 10, a first pressure sensor 11, a second pressure sensor 12, a battery 13, and a vehicle controller 14. In the example of FIG. 1, the vehicle 100 travels by having the engine 1 and the electric motor 5 rotate the drive wheels 8. Outside air drawn into the vehicle passes through the engine 1, the exhaust gas purification device 2, and the after-treatment device 3 in this order, and is discharged to the outside.

The engine 1 generates an engine driving force (corresponding to a second driving force) for rotationally driving the drive wheels 8 of the vehicle 100. The exhaust gas purification device 2 purifies exhaust gas generated in the engine 1. For example, the exhaust gas purification device 2 includes a DPF (Diesel Particulate Filter) for collecting soot in the exhaust gas, and a DOC (Diesel Oxidation Catalyst) provided in the stage preceding the DPF, for example. The exhaust gas purification device 2 may include an SCR (Selective Catalytic Reduction) catalyst.

The after-treatment device 3 includes the SCR catalyst, for example. The after-treatment device 3 reduces nitrogen oxides in the exhaust gas.

The generator 4 generates electric power by using the engine driving force generated by the engine 1. The generator 4 is provided in or around a flywheel of the engine 1, for example. The generator 4 may also operate as an electric motor.

The electric motor 5 generates an electric driving force (corresponding to a first driving force) for rotationally driving the drive wheels 8 of the vehicle 100. The electric motor 5 assists the engine driving force generated by the engine 1. The electric motor 5 can cause the vehicle 100 to travel only by the generated electric driving force. The electric motor 5 may also operate as a generator. For example, the electric motor 5 may operate as a regenerative brake during braking to generate electric power.

By changing a combination of gears, the transmission 6 increases a torque generated by the engine 1 and transmits the increased torque to the differential gear 7 and the drive wheels 8. The differential gear 7 causes the drive wheels 8 that are on the outer side to rotate relatively quickly and the drive wheels 8 that are on the inner side to rotate relatively slowly when the vehicle 100 turns.

The first clutch 9 is provided between the generator 4 and the electric motor 5. The first clutch 9 switches between (i) an ON state in which the engine driving force generated by the engine 1 is transmitted to the drive wheels 8 of the vehicle 100 and (ii) an OFF state in which said engine driving force is not transmitted to the drive wheels 8. The second clutch 10 switches between (i) an ON state in which the electric driving force generated by the electric motor 5 and the engine driving force are transmitted to the drive wheels 8 of the vehicle 100 and (ii) an OFF state in which the electric driving force and the engine driving force are not transmitted to the drive wheels 8.

The first pressure sensor 11 measures a first pressure of the exhaust gas before passing through the exhaust gas purification device 2. The first pressure sensor 11 inputs the measured first pressure to the vehicle controller 14. The second pressure sensor 12 measures a second pressure of the exhaust gas after passing through the exhaust gas purification device 2. The second pressure sensor 12 inputs the measured second pressure to the vehicle controller 14.

The battery 13 stores the electric power generated by the generator 4. The battery 13 supplies the stored electric power to the electric motor 5. The vehicle controller 14 includes a processor. The vehicle controller 14 includes an HEV (Hybrid Electric Vehicle) controller, for example. The vehicle controller 14 executes a power generation process performed by the generator 4 and a process of assisting the engine 1 with the electric motor 5, for example.

In the exhaust gas purification device 2, purification performance of the exhaust gas gradually decreases due to soot being accumulated. In order to regenerate the exhaust gas purification device 2, in which soot is accumulated, during traveling of while the vehicle 100, the vehicle controller 14 first switches the first clutch 9 to the OFF state in which the engine driving force is not transmitted to the drive wheels 8. The vehicle controller 14 supplies the electric power generated by the generator 4 to the electric motor 5 with the first clutch 9 in the OFF state, and causes the vehicle 100 to travel on the electric driving force generated by the electric motor 5. At this time, the vehicle controller 14 increases a temperature of the exhaust gas by increasing the rotational speed of the engine 1 as compared to when the first clutch 9 is in the ON state in which the engine driving force is transmitted to the drive wheels 8.

In this way, by increasing the temperature of the exhaust gas, the vehicle controller 14 can incinerate the soot collected by the exhaust gas purification device 2. Therefore, the vehicle controller 14 can suppress a reduction of removal performance of carbon dioxide, nitrogen oxides, or the like due to the accumulation of soot in the exhaust gas purification device 2. Since the vehicle controller 14 generates electric power in the generator 4 by using the engine driving force of the engine 1 whose rotational speed is increased in order to increase the temperature of the exhaust gas, and reuses the electric power with the electric motor 5, it is possible to suppress a reduction of fuel efficiency of the vehicle 100 at the time of incinerating the soot collected by the exhaust gas purification device 2.

[Configuration of Main Parts of the Vehicle 100]

Figure 2:
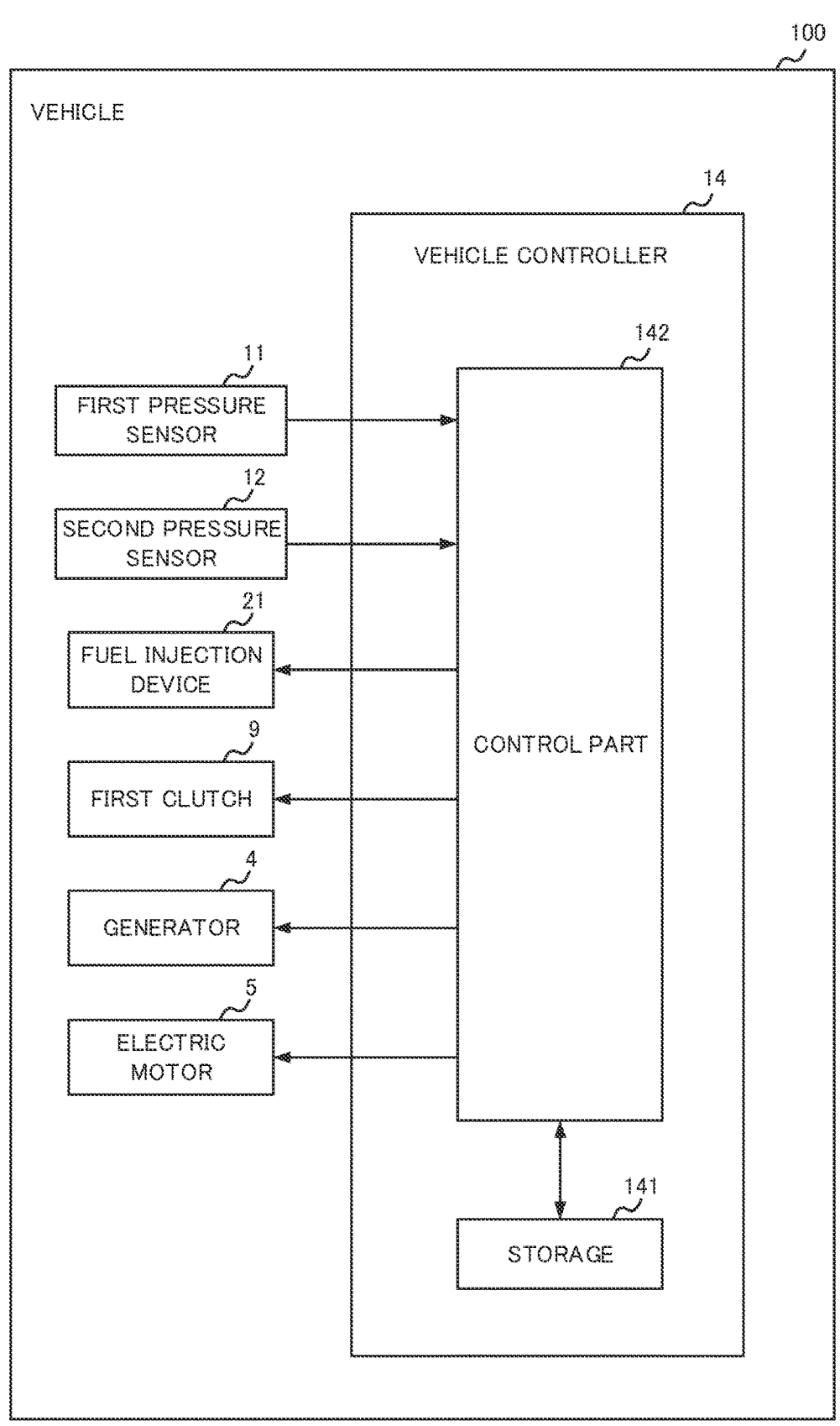
FIG. 2 shows a configuration of main parts of the vehicle.

FIG. 2 shows a configuration of main parts of the vehicle 100. The vehicle 100 includes the first pressure sensor 11, the second pressure sensor 12, a fuel injection device 21, the first clutch 9, the generator 4, the electric motor 5, and the vehicle controller 14. The vehicle controller 14 includes a storage 141 and a control part 142.

The fuel injection device 21 injects fuel into a cylinder of the engine 1. The fuel injection device 21 injects an injection amount of fuel instructed by the control part 142 into the cylinder of the engine 1. The storage 141 includes a ROM (Read Only Memory), a RAM (Random Access Memory), and the like, for example. The storage 141 stores various types of programs for causing the control part 142 to function and various types of data.

The control part 142 is a processor mounted on the vehicle controller 14, for example. The control part 142 executes various functions by executing the programs stored in the storage 141. The control part 142 acquires information indicating the first pressure measured by the first pressure sensor 11. The control part 142 acquires information indicating the second pressure measured by the second pressure sensor 12. The control part 142 calculates a pressure difference between the acquired first pressure and second pressure. This pressure difference is a difference that arises because, when soot accumulates in a filter of the exhaust gas purification device 2, it hinders the smooth passage of the exhaust gas through the exhaust gas purification device 2. The greater the amount of soot accumulated, the larger this pressure difference becomes.

Although details will be described later, the control part 142 incinerates the soot accumulated in the exhaust gas purification device 2 on the basis of the calculated pressure difference. For example, if the pressure difference is equal to or greater than a threshold value, the control part 142 increases the engine speed by increasing the amount of fuel injected by the fuel injection device 21. The control part 142 incinerates the soot accumulated in the exhaust gas purification device 2 by increasing the engine speed. Hereinafter, a regeneration process of the exhaust gas purification device 2 will be described for each situation of the vehicle 100 during regeneration.

[Case where the Regeneration of the Exhaust Gas Purification Device 2 is not Performed]

If the acquired pressure difference between the first pressure and the second pressure is less than a combustion threshold value or less than a preparation threshold value, the control part 142 does not incinerate the soot accumulated in the exhaust gas purification device 2. The combustion threshold value is determined as a value corresponding to a period required for incinerating the soot collected in the exhaust gas purification device 2, for example. The preparation threshold value indicates a value smaller than the combustion threshold. If the acquired pressure difference between the first pressure and the second pressure is less than the combustion threshold value or less than the preparation threshold value, the control part 142 switches the first clutch 9 to the ON state in which the engine driving force is transmitted to the drive wheels 8, and rotationally drives the drive wheels 8 with both the electric driving force and the engine driving force. The control part 142 operates the second clutch 10 in the ON state in which the electric driving force generated by the electric motor 5 and the engine driving force are transmitted to the drive wheels 8 of the vehicle 100.

[Case where the Regeneration of the Exhaust Gas Purification Device 2 is Performed]

If it is determined that the pressure difference between the first pressure and the second pressure is equal to or greater than the combustion threshold value during traveling of the vehicle 100 or during a stoppage of the vehicle 100, the control part 142 incinerates the soot, which is accumulated in the exhaust gas purification device 2, during idling or traveling of the vehicle 100 according to a driving operation of a driver. First, an example in which the control part 142 incinerates the soot accumulated in the exhaust gas purification device 2 during the idling of the vehicle 100 will be described.

[Case where the Regeneration of the Exhaust Gas Purification Device 2 is Performed During the Idling]

In the case of incinerating the soot accumulated in the exhaust gas purification device 2 during the idling, the control part 142 switches the first clutch 9 to the OFF state in which the engine driving force is not transmitted to the drive wheels 8, and increases the rotational speed of the engine 1 to a greater degree than when the first clutch 9 is in the ON state in which the engine driving force is transmitted to the drive wheels 8. The control part 142 increases the temperature of the exhaust gas from the engine 1 by increasing the rotational speed of the engine 1. At this time, the control part 142 causes the generator 4 to generate electric power by using the engine driving force, and supplies the electric power to the battery 13. If the control part 142 is connected to an external device such as household electric equipment or electric storage equipment via a converter, the control part 142 may supply the electric power generated by the generator 4 to the external device, instead of supplying this electric power to the battery 13.

[Case where the Regeneration of the Exhaust Gas Purification Device 2 is Performed During Traveling]

In the case of incinerating the soot accumulated in the exhaust gas purification device 2 during traveling of the vehicle 100, the control part 142 switches the first clutch 9 to the OFF state in which the engine driving force is not transmitted to the drive wheels 8, and causes the vehicle 100 to travel on the electric driving force. While the vehicle 100 is traveling on the electric driving force with the first clutch 9 being in the OFF state, the control part 142 increases the temperature of the exhaust gas from the engine 1 by increasing the rotational speed of the engine 1 more than when the first clutch 9 is in the ON state in which the engine driving force is transmitted to the drive wheels 8. The control part 142 causes the generator 4 to generate electric power by using the engine driving force, and supplies the electric power to the electric motor 5. At this time, the control part 142 operates the second clutch 10 to be in the ON state in which the electric driving force generated by the electric motor 5 is transmitted to the drive wheels 8.

[Case where the Regeneration of the Exhaust Gas Purification Device 2 is Performed after the Battery Level has been Lowered]

The control part 142 increases the engine speed during incineration of the soot collected by the exhaust gas purification device 2. At this time, as the engine speed increases, the amount of electric power generated by the generator 4 also increases. To secure available capacity for storing said electric power in the battery 13, the control part 142 may consume electric power stored in the battery 13 before incinerating the soot collected by the exhaust gas purification device 2.

If it is determined that the pressure difference between the first pressure and the second pressure is equal to or greater than a preliminary threshold value and less than the combustion threshold value during traveling of the vehicle 100, the control part 142 increases the ratio of rotationally driving the drive wheels 8 with the electric driving force, from among the engine driving force and the electric driving force, in comparison to the case where the pressure difference is less than the preliminary threshold value. The preliminary threshold value is less than the combustion threshold value. At this time, the control part 142 switches the first clutch 9 to the ON state in which the engine driving force is transmitted to the drive wheels 8, and operates the second clutch 10 to be in the ON state in which the engine driving force and the electric driving force are transmitted to the drive wheel 8. In this way, the control part 142 can increase the amount of power consumed by the electric motor 5.

Figure 3:
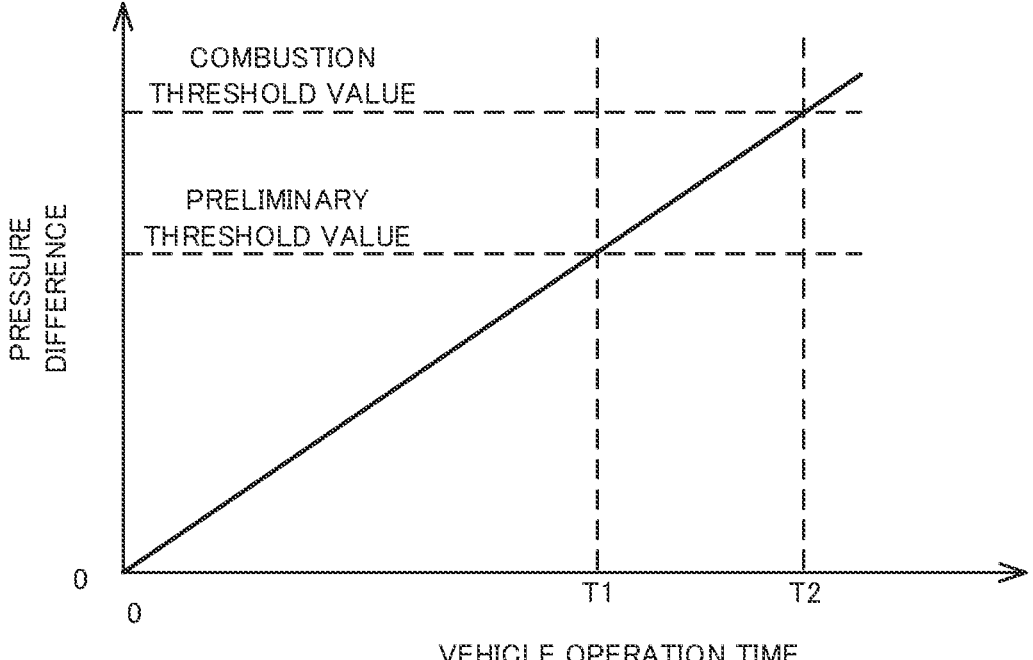
FIG. 3 shows change over time in a pressure difference between a first pressure and a second pressure.

Then, due to continued collection of soot by the exhaust gas purification device 2, the pressure difference between the first pressure and the second pressure gradually increases. FIG. 3 shows change over time in the pressure difference between the first pressure and the second pressure. The vertical axis of FIG. 3 represents the pressure difference between the first pressure and the second pressure. The horizontal axis of FIG. 3 represents the vehicle operation time since the previous regeneration process of the exhaust gas purification device 2. As shown in FIG. 3, as the vehicle operation time increases, the pressure difference between the first pressure and the second pressure monotonously increases. In the example of FIG. 3, when the vehicle operation time is T1, the pressure difference between the first pressure and the second pressure is equal to the preliminary threshold value. When the vehicle operation time is T2, the pressure difference between the first pressure and the second pressure is equal to the combustion threshold value.

If it is determined that the pressure difference between the first pressure and the second pressure is equal to or greater than the combustion threshold value during traveling of the vehicle 100, the control part 142 switches the first clutch 9 to the OFF state in which the engine driving force is not transmitted to the drive wheels 8. The control part 142 causes the vehicle 100 to travel on the electric driving force with the first clutch 9 being in the OFF state. At this time, as described above, the control part 142 incinerates the soot collected by the exhaust gas purification device 2 by increasing the rotational speed of the engine 1.

Figure 4:
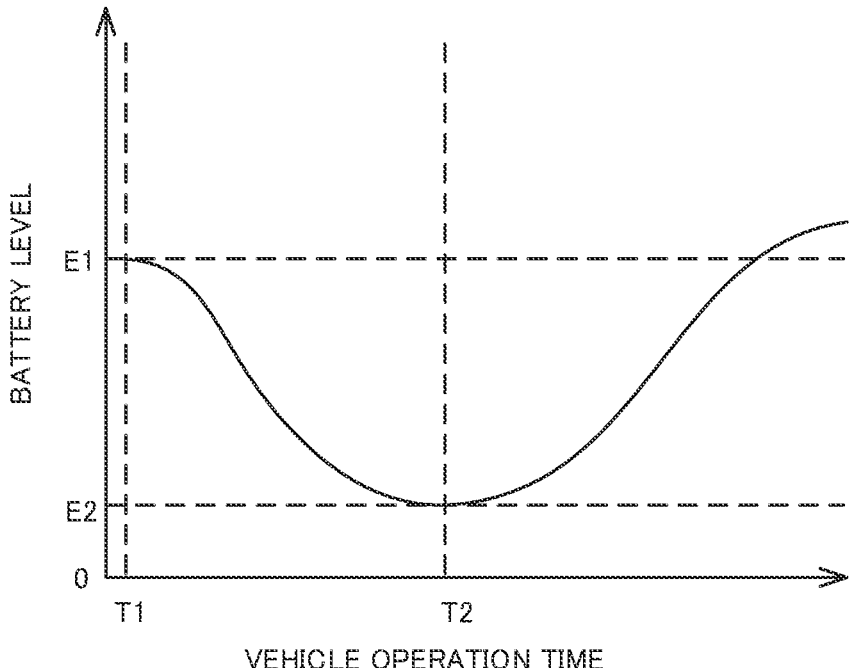
FIG. 4 shows change over time in a state of charge of a battery.

FIG. 4 shows change over time of the battery level of the battery 13. The vertical axis in FIG. 4 indicates the battery level of the battery 13. The horizontal axis of FIG. 4 represents the vehicle operation time. In the example of FIG. 4, the battery level at the vehicle operation time T1, (see FIG. 3) at which the pressure difference between the first pressure and the second pressure becomes equal to the preliminary threshold value, is E1. At this time, the control part 142 gradually lowers the battery level by making the electric driving force larger than the engine driving force, among the electric driving force and the engine driving force for rotationally driving the drive wheels 8.

In the vehicle operation time T2 in which the pressure difference between the first pressure and the second pressure becomes equal to the combustion threshold value, the battery level becomes E2, which is lower than E1. At this time, the control part 142 increases the amount of electricity generated by the generator 4 by increasing the rotational speed of the engine 1 in comparison to when the first clutch 9 is in the ON state. In the example of FIG. 4, the generated electricity amount after it has been increased is greater than the amount of power consumed by the electric motor 5. Therefore, while the control part 142 increases the rotational speed of the engine 1, the battery level (State of Charge, for example) is gradually increased.

[Processing Procedure for Regenerating the Exhaust Gas Purification Device 2 Performed by the Vehicle Controller 14]

Figure 5:
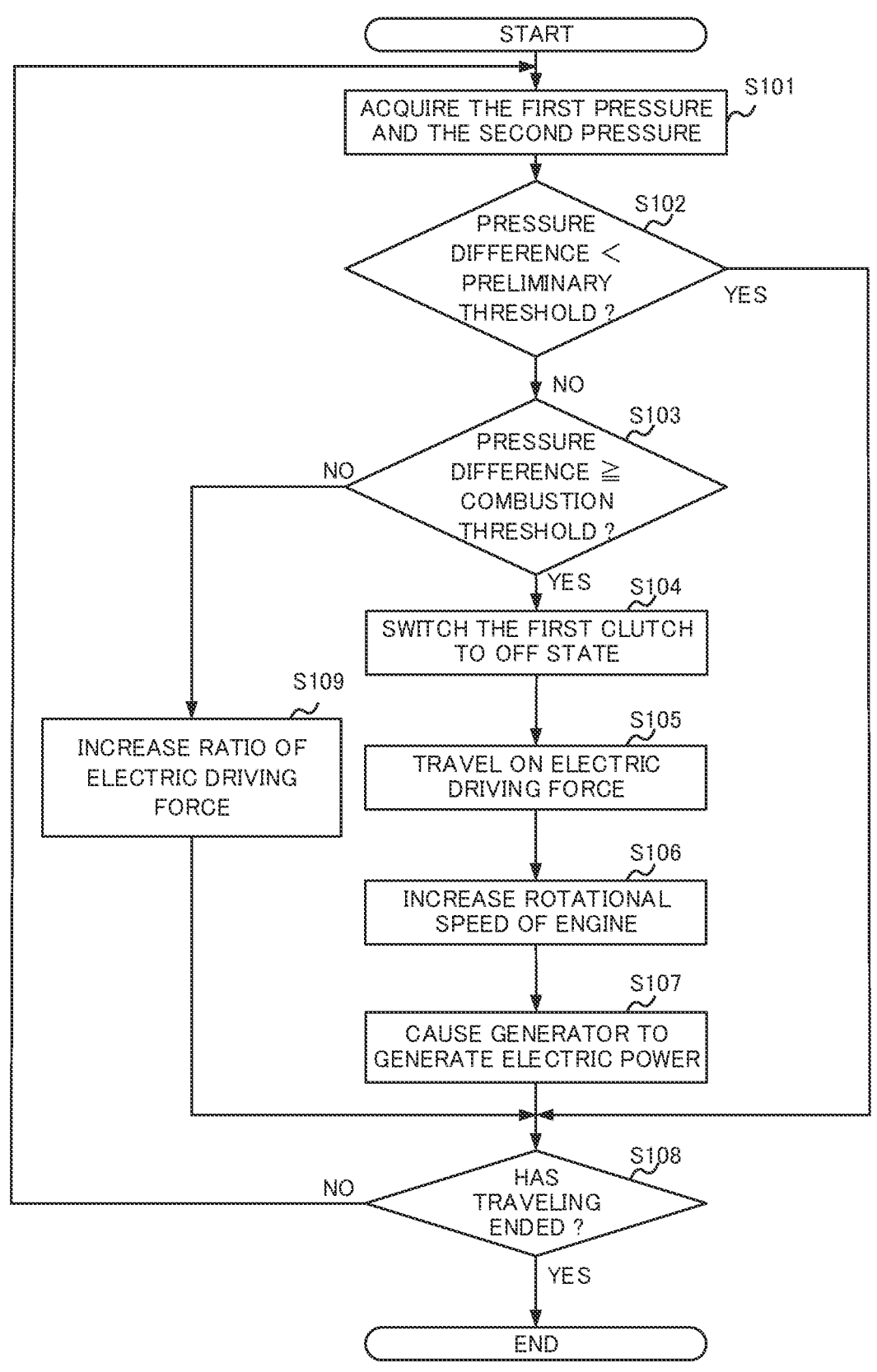
FIG. 5 is a flowchart showing a processing procedure for regenerating an exhaust gas purification device performed by a vehicle controller.

FIG. 5 is a flowchart showing a processing procedure for regenerating the exhaust gas purification device 2 performed by the vehicle controller 14. This processing procedure starts when the vehicle 100 is traveling, for example. First, the control part 142 acquires information indicating first pressure of the exhaust gas before passing through the exhaust gas purification device 2, from the first pressure sensor 11. The control part 142 acquires information indicating second pressure of the exhaust gas after passing through the exhaust gas purification device 2, from the second pressure sensor 12 (S101).

The control part 142 calculates a pressure difference between the first pressure and the second pressure. The control part 142 determines whether or not the calculated pressure difference is less than a preliminary threshold value (S102). If it is determined that the pressure difference is equal to or greater than the preliminary threshold value (NO in S102), the control part 142 determines whether the pressure difference is equal to or greater than a combustion threshold value (S103). If the pressure difference is equal to or greater than the combustion threshold value (YES in S103), the control part 142 switches the first clutch 9 to the OFF state in which an engine driving force is not transmitted to the drive wheels 8 (S104), and causes the vehicle 100 to travel on the electric driving force (S105).

The control part 142 incinerates soot collected by the exhaust gas purification device 2 by increasing a temperature of the exhaust gas from the engine 1 by increasing the rotational speed of the engine 1 as compared with when the first clutch 9 is in the ON state in which the engine driving force is transmitted to the drive wheels 8 (S106). The control part 142 causes the generator 4 to generate electric power by using rotation of the engine 1 (S107). The control part 142 determines whether or not the traveling of the vehicle 100 has ended (S108). If it is determined that the traveling of the vehicle 100 has ended (YES in S108), the control part 142 ends the process.

If it is determined that the pressure difference is less than the preliminary threshold value in the determination in S102 (YES in S102), the control part 142 proceeds to the determination of S108. If it is determined that the pressure difference is less than the combustion threshold value in the determination in S103 (NO in S103), the control part 142 increases the ratio of rotationally driving the drive wheels 8 with the electric driving force, from among the engine driving force and the electric driving force for rotationally driving the drive wheels 8, in comparison to the case where the pressure difference is less than the preliminary threshold value (S109), and proceeds to the determination of S108. If it is determined that the traveling of the vehicle 100 has not ended in the determination in S108 (NO in S108), the control part 142 returns to the process in S101.

[Effect of the Vehicle Controller 14 of the Present Embodiment]

The control part 142 can incinerate the soot collected by the exhaust gas purification device 2 by increasing the temperature of the exhaust gas. Therefore, the control part 142 can suppress a reduction in the removal performance of carbon dioxide, nitrogen oxides, or the like caused by the exhaust gas purification device 2. Since the control part 142 generates electric power in the generator 4 by using the engine driving force of the engine 1 whose rotational speed is increased in order to increase the temperature of the exhaust gas, and reuses the electric power by the electric motor 5, it is possible to suppress the reduction of fuel efficiency of the vehicle 100 at the time of incinerating the soot collected by the exhaust gas purification device 2.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A vehicle comprising:

an electric motor that generates a first driving force for rotationally driving drive wheels of the vehicle;

an engine that generates a second driving force for rotationally driving the drive wheels of the vehicle;

an exhaust gas purification device that purifies exhaust gas generated in the engine;

a generator that generates electric power using the second driving force;

a battery that stores the electric power generated by the generator;

a clutch, provided between the generator and the electric motor, that switches between transmitting the second driving force to the drive wheels and not transmitting the second driving force to the drive wheel;

a first pressure sensor that measures a first pressure of the exhaust gas before passing through the exhaust gas purification device;

a second pressure sensor that measures a second pressure of the exhaust gas after passing through the exhaust gas purification device; and a control device that, when the second driving force is not transmitted to the drive wheels while the vehicle is travelling, causes the electric motor to generate the first driving force using the electric power generated by the generator with the second driving force produced by causing the engine to operates at a higher rotational speed than when the second driving force is transmitted to the drive wheels during traveling of the vehicle, wherein:

the control device increases a ratio of rotationally driving the drive wheels with the first driving force, among the first driving force and the second driving force, compared to a case where the pressure difference is less than a preliminary threshold value, so that a remaining amount of the battery decreases, if the pressure difference between the first pressure and the second pressure is equal to or greater than the preliminary threshold value, which is smaller than a combustion threshold value of soot, and less than the combustion threshold value, the control device, after increasing the ratio of rotationally driving the drive wheels with the first driving force, among the first driving force and the second driving force, if the pressure difference between the first pressure and the second pressure is equal to or greater than the combustion threshold value while the vehicle is travelling, switches the clutch to a state in which the second driving force is not transmitted to the drive wheels, and the control device increases a rotational speed of the engine so that the remaining amount of the battery is increased by the generator, when, after the ratio of rotationally driving the drive wheels with the first driving force, among the first driving force and the second driving force, has been increased and while the vehicle is traveling, the pressure difference between the first pressure and the second pressure is equal to or greater than the combustion threshold value.

2. The vehicle according to claim 1, wherein the electric motor increases a ratio of rotationally driving the drive wheels with the first driving force, among the first driving force and the second driving force, in comparison to a case where the pressure difference is less than a preliminary threshold value which is less than the combustion threshold value, if the pressure difference between the first pressure and the second pressure is equal to or greater than the preliminary threshold value and less than the combustion threshold value.

3. The vehicle according to claim 1, further comprising:

a battery that stores the electric power generated by the generator;

a first pressure sensor that measures a first pressure of the exhaust gas before passing through the exhaust gas purification device; and a second pressure sensor that measures a second pressure of the exhaust gas after passing through the exhaust gas purification device, wherein the clutch switches to a state in which the second driving force is not transmitted to the drive wheels if a pressure difference between the first pressure and the second pressure is equal to or greater than the combustion threshold value while the vehicle is stopped, the engine increases a rotational speed of the engine in comparison to a state in which the second driving force is transmitted to the drive wheels, if the pressure difference between the first pressure and the second pressure is equal to or greater than the combustion threshold value while the vehicle is stopped, and the generator supplies the electric power generated by using the second driving force to the battery, if the pressure difference between the first pressure and the second pressure is equal to or greater than the combustion threshold value while the vehicle is stopped.

* * * * *